United States Patent [19]
Borchardt et al.

[11] Patent Number: 5,513,317
[45] Date of Patent: Apr. 30, 1996

[54] SYSTEM AND METHOD FOR PERMITTING RAPID REFINEMENT OF DATA OUTPUT FROM A DEBUGGER

[75] Inventors: Edward K. Borchardt, Chapel Hill; Scott G. Carley, Cary; Anthony H. Lindsey, Fuquay Varina; John T. Mason, Apex, all of N.C.; George A. McKenna, Wilsonville, Oreg.; Pamela B. Owens, Durham, N.C.; Bruce G. Whitenack, Jr., Raleigh, N.C.; Timothy Wilson, Chapel Hill, N.C.

[73] Assignee: International Business Machines Corporation, Armonk, N.Y.

[21] Appl. No.: 943,163

[22] Filed: Sep. 10, 1992

[51] Int. Cl.⁶ .................................................. G06F 11/00
[52] U.S. Cl. ........................... 395/183.21; 395/183.14
[58] Field of Search ........................... 395/575, 183.13, 395/183.21, 183.01; 364/267.91, 275.5; 371/19

[56] References Cited

U.S. PATENT DOCUMENTS

| | | | |
|---|---|---|---|
| 4,802,165 | 1/1989 | Ream | 371/19 |
| 4,954,942 | 9/1990 | Masuda et al. | 364/200 |
| 5,067,073 | 11/1991 | Andrews | 395/375 |
| 5,093,914 | 3/1992 | Coplien et al. | 395/700 |
| 5,124,989 | 6/1992 | Padawer et al. | 371/19 |
| 5,165,036 | 11/1992 | Miyata et al. | 395/800 |
| 5,210,859 | 5/1993 | Aoshima et al. | 395/575 |
| 5,255,385 | 10/1993 | Kikuchi | 395/575 |

Primary Examiner—Robert W. Beausoliel, Jr.
Assistant Examiner—Norman M. Wright
Attorney, Agent, or Firm—Gregory M. Doudnikoff

[57] ABSTRACT

A system and method for enabling re-filtering of trace history data in a debugger without re-executing the program. Trace history data is stored together with its category information when the program is initially executed and trace history text is output to a user. If re-filtering is necessary, the new filtering criteria is applied to the stored trace history data and new text is output to the user.

9 Claims, 2 Drawing Sheets

SYSTEM AND METHOD FOR PERMITTING RAPID REFINEMENT OF DATA OUTPUT FROM A DEBUGGER

BACKGROUND OF THE INVENTION

1. Field of the Invention

The present invention relates to a system and method which permit data output from the debugging of a software application to be re-utilized. More particularly, the present invention relates to a system and method whereby data output from the debugging of a software application can be run through a new set of debugging criteria without requiring re-execution of the application.

2. Description of the Related Art

Newly created software programs or applications typically contain a number of inadvertent programming errors, known as "bugs". Following the creation of an application, the application is typically "debugged" in order to find, correct and/or remove the bugs. While some errors or bugs can be relatively easy to find and correct, other bugs may be quite difficult to locate, appearing only under certain circumstances or conditions. These bugs are much more troublesome.

In today's marketplace, error filled or buggy commercial programs will not be well accepted. However, debugging a program or an application is one of the most difficult and time consuming, and therefore expensive, steps involved in creating a computer program or application. While a programmer may be able to manually debug a short or relatively simple program by following the logic from a version of the program in a human perceivable form (such as source code), such is not the case with relatively long or relatively complex programs, which may include numerous calls, variables, subroutines, etc.

Typically, a program is put through a number of test scenarios to make sure it functions properly. A number of debugging programs or tools known as debuggers have been developed to assist the programmer in debugging applications. Debuggers permit programmers to view the execution of the software program and provide some mechanism for controlling the execution. Good debuggers also give the programmer control of data values and logic branches so that the programmer can force all possible paths to ensure good testing.

One component for debuggers is the trace facility. The trace facility function captures and presents textual information regarding the history of a given execution path, providing a history of control flow, data movement and other related information pertaining to the program or application being debugged during the debugging session. This form of information is invaluable when attempting to debug problems that cannot easily be isolated to one module or one small, localized set of modules.

However, the volume of information provided by the trace facility can grow to such large proportions as to obscure the few relevant pieces of information that the trace facility has captured. That is, the first set or first few sets of trace or filtering criteria will rarely provide the ideal level of trace information. In each such case, the programmer must readjust the filtering criteria and re-execute the application being debugged under the appropriate test scenario. While changing the filtering criteria is a small task, re-executing the test scenario can be time consuming and tie up valuable computer resources and therefore be quite expensive. The only alternative presently available is to sift through the unnecessary data to find the relevant information, which can also be time consuming and expensive.

Accordingly, a need has developed for a trace facility component that can rapidly and inexpensively permit a programmer to hone in on the problematic portions of the program.

SUMMARY OF THE INVENTION

Accordingly, an object of the present invention is to provide a system and method for permitting a programmer to obtain and re-filter historical trace information without re-executing the program being debugged.

A further object of the present invention is to provide a debugger capable of performing multiple layers of filtering based upon a single execution of the program being debugged.

Still another object of the present invention is to enable a programmer to save time and reduce costs when debugging a program utilizing a historical trace function.

Other objects and advantages will be set forth in part in the description and the drawings which follow and, in part, will be obvious from the description or may be learned by practice of the invention.

To achieve the foregoing objects, and in accordance with the purpose of the invention as broadly described herein, a method is provided for performing multiple layers of filtering of trace information based on a single execution of a program being debugged, comprising the steps of setting trace filter criteria, executing the program and generating, based on categories of the trace filter criteria, and storing trace entries with category information, generating initial filtered data from the trace entries based on the trace filter criteria, setting new trace filter criteria, and generating additional filtered data based on the new trace criteria. The steps of setting new trace filter criteria and generating additional filtered data may be repeated as many times as required by a user. The method may further comprise the step of displaying the filtered data on a display device. Preferably, the trace entries are stored as object oriented objects.

A system is also provided for permitting re-filtering of trace facility output comprising means for setting initial trace criteria, means for executing the program and generating trace information by criteria category during execution of the program, means for storing the trace information, means for generating filtered data from the generated trace information means for setting new trace criteria, and means for generated new filtered data from the generated trace information based on the new trace criteria. The system further comprises a device for displaying the filtered data and new filtered data to a user as the filtered data is generated.

The present invention will now be described with reference to the following drawings, in which like reference numbers denote the same elements throughout.

DESCRIPTION OF THE PREFERRED EMBODIMENT

Figure 1:
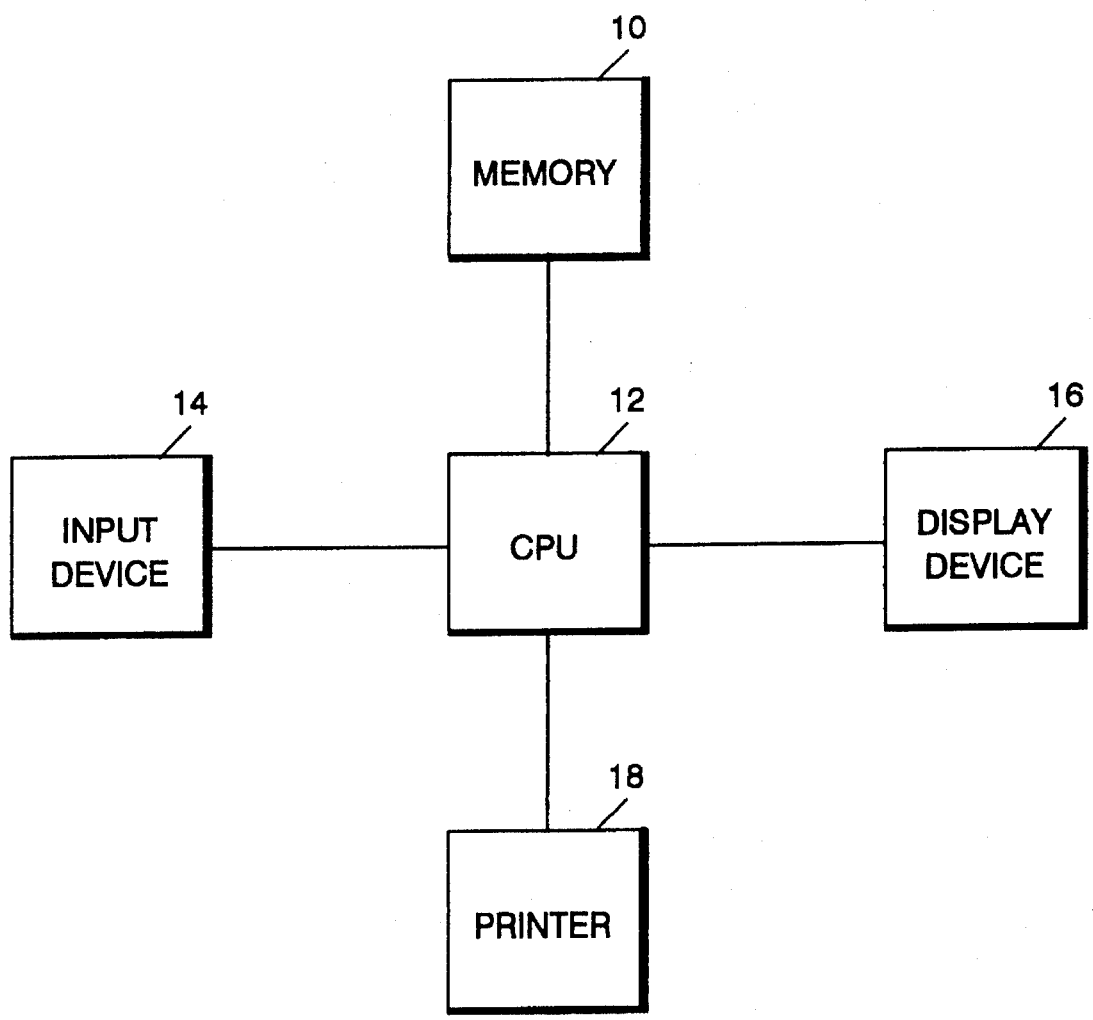
FIG. 1 is a block diagram of a system embodying the present invention.

FIG. 1 illustrates a computer environment capable of embodying the present invention. Both the program to be debugged and the debugging tool to be applied to the program are resident in memory 10, which is associated in a central processing unit (CPU) 12 capable of executing the program in accordance with the requirements of the debugging tool. The CPU 12 may be associated with a host or mainframe computer, a workstation or a personal computer. A programmer can input debugging instructions to the CPU 12 via an input device 14 such as a keyboard so that the CPU 12 will execute the program in accordance with a predetermined or newly input test scenario with or without employing a trace facility. If the programmer selects the trace facility option, the programmer can rely on a default filter or trace criteria or can input specialized criteria. Upon execution of the program and application of the filter criteria, text output is made available to the programmer over a display device 16 and/or via a printer 18.

In prior art debugging systems, the state of the art trace facility permits a programmer to provide a single level of filter criteria for each execution of the program. In such systems, when the trace facility is utilized during debugging, the program is executed in accordance with the test scenario provided by the programmer. The trace facility gathers historical information during the execution of the program pursuant to the filter criteria, and typically makes the filtered historical information in text form immediately available to the programmer on a real time basis. However, the programmer may find the text information to be unusable because the filter criteria employed was too broad or too narrow, and the filtered trace data provided to the programmer contained so much information as to be of little assistance in finding the bug or so little information as to not be of any help. In this situation, the programmer must redefine the filter criteria and re-execute the program while utilizing the trace facility and the redefined filter criteria.

Figure 2:
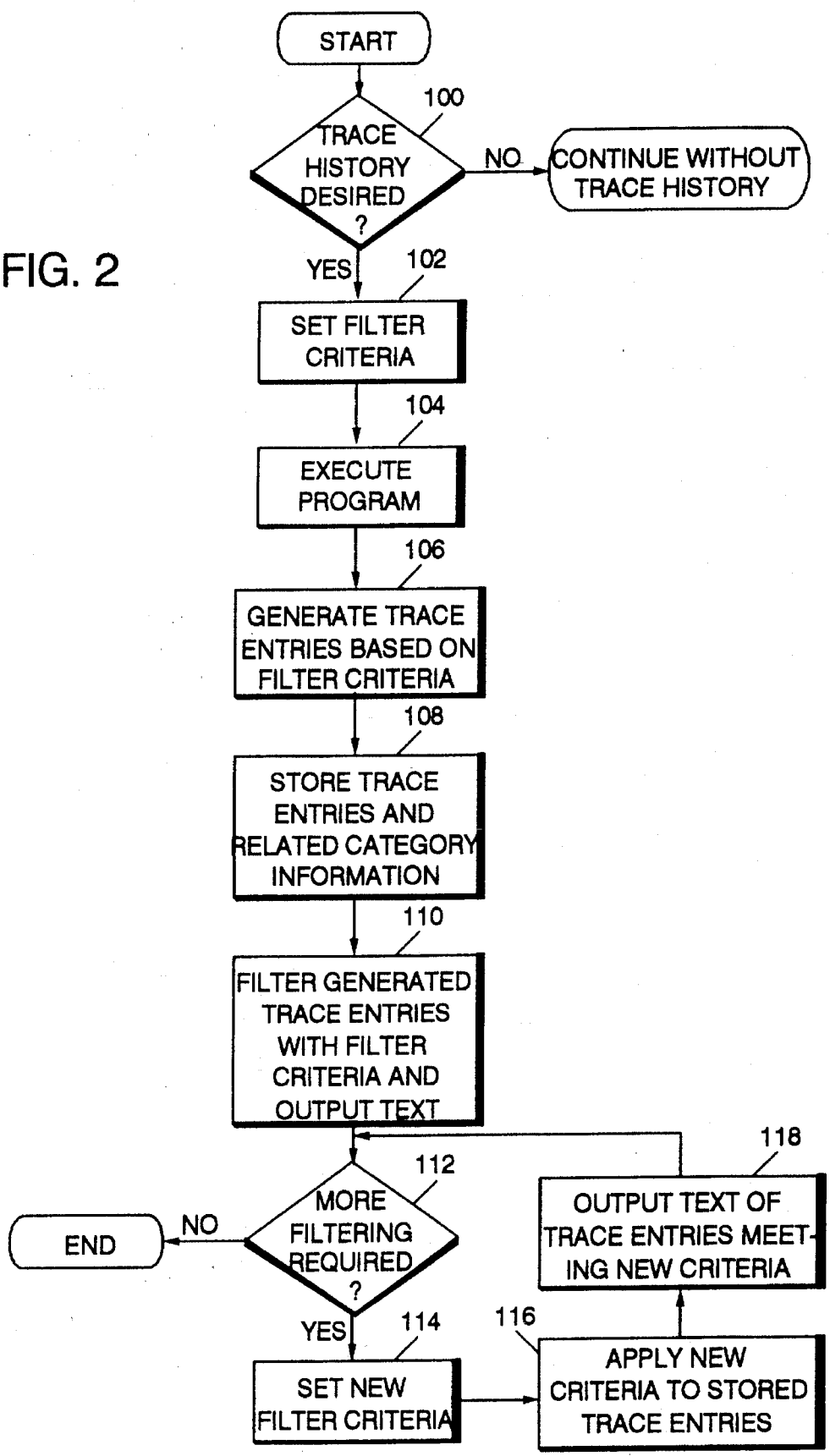
FIG. 2 is a flowchart which sets forth the logic in accordance with the present invention.

As discussed, the present invention eliminates the need to re-execute the program. This is achieved in the following way, and will be described with reference to the flowchart of FIG. 2.

As discussed, when a programmer debugs a program, the programmer utilizes a test scenario designed to force as many possible logic paths or desired problematic logic paths when executing the program. For the present invention, after inputting a new or designating an existing test scenario, the programmer decides if the use of the available trace facility option is desired (Step 100). If not, the debugging of the program proceeds without the use of the present invention. If desired, the trace facility of the present invention becomes active. The initial filtering criteria (trace facility options) may at this time be input by the programmer (Step 102). If no such information is input, default criteria will typically automatically be used by the debugger. Typical trace filters (which also comprise some of the categories discussed below) that are valuable to programmers include message related entries, such as informational messages, warning messages and error messages, data-related entries, such as data read during execution, data written during execution, parameter results, conditional results and file and database input/output, and logic-related entries, such as source code statements, control flow labels and SQL statements. Filters can also be set which look for the source code statement entry which caused any trace entry to be generated by above-listed filters to be created or which look for or suppress information related to a given text string. The latter filter type can be used in combination with any of the previously described filters. Upon setting the criteria, the trace facility is ready for implementation with respect to the execution of the program in accordance with the given test scenario (Steps 104+).

First, the program is executed while the trace facility is active (Step 104). However, rather than immediately supply text representation of the filtered entries to the programmer, the trace facility gathers all historical trace data which may be pertinent to any category/filter of the trace criteria (Step 106). Trace output categories are defined which map to the filtering criteria, and each trace output entry which is produced during execution is associated with one or more of these categories. This data is stored in memory 10 for future use (Step 108). Accordingly, all of the information generated by the trace facility remains available to the user. These trace entries retain information regarding their origin, and thus remain usable, as opposed to the filtered text which is output by the prior art and may only be further filtered with regard to text strings found in the different entries, if at all. The trace entries may be stored in many forms, but it has been found that storing them as object oriented objects is preferable, since the nature of such objects lends itself to maintaining the identity or origin information of the data produced by the trace facility.

As the trace entries are generated, the specific filtering criteria designated by the programmer is applied to the trace entries, and this information (in text form) is normally immediately made available to the programmer, for example, as a window on a display device (Step 110). The programmer then reviews text output, and, if the output provided is extensive or includes unnecessary data or is incomplete or does not include enough information, determines if another layer of filtering is required under different criteria (Step 112). If so, rather than setting the new criteria and re-executing the program, the programmer inputs the new filtering criteria (Step 114) and the debugger re-filters the stored trace entries (Step 116) to restrict the data provided to a manageable quantity. This is carried out by looping through all of the trace output entries gathered in memory and outputting to the user the trace entries (in textual form) which meet the new criteria (Step 118). Steps 112 through 118 may be repeated any number of times until the programmer is satisfied.

One of the significant features of the present invention is that trace information gathered in accordance with the filter criteria is not immediately converted to textual representations thereof, but rather stored in memory, retaining its identity as relating to a certain filter, that is, being a certain type of trace information.

While a preferred embodiment of the present invention has been described, variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A method for performing multiple layers of filtering of trace information based on a single execution of a program being debugged, comprising the steps of:

(a) setting trace filter criteria;

(b) executing the program and generating, based on categories of the trace filter criteria, and storing trace entries with category information;

(c) generating initial filtered data from the stored trace entries based on the trace filter criteria;

(d) setting new trace filter criteria; and (e) generating new filtered data from the stored trace entries based on the new trace criteria.

2. A method according to claim 1, further comprising the step of (f) repeating said steps (d) and (e).

3. A method according to claim 1, further comprising the step of (g), after generating the initial or new filtered data, displaying the filtered data on a display device.

4. A method according to claim 1, wherein the initial and new filtered data is in textual form.

5. A method according to claim 1, wherein the trace entries are stored as object oriented objects.

6. A method according to claim 1, wherein the trace filter criteria set in said step (a) is set by a user.

7. A method according to claim 1, wherein said step (a) further comprises setting the trace filter criteria to system default trace filter criteria if the trace filter criteria is not input by a user.

8. A system for permitting re-filtering of trace facility output comprising:

means for setting initial trace criteria;

means for executing the program and generating trace information by criteria category during execution of the program;

means for storing the trace information;

means for generating filtered data from the generated trace information;

means for setting new trace criteria;

and means for generating new filtered data from the generated trace information based on the new trace criteria without re-executing the program.

9. A system according to claim 8, further comprising means for displaying the filtered data and new filtered data to a user as the filtered data is generated.

* * * * *